J. P. DANIELS.
AUTOMOBILE SPRING CLIP.
APPLICATION FILED NOV. 18, 1921.
1,435,052.
Patented Nov. 7, 1922.
3 SHEETS—SHEET 2.
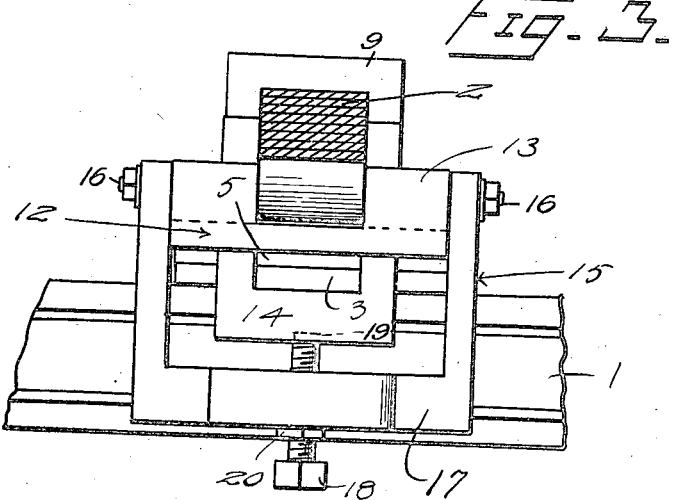
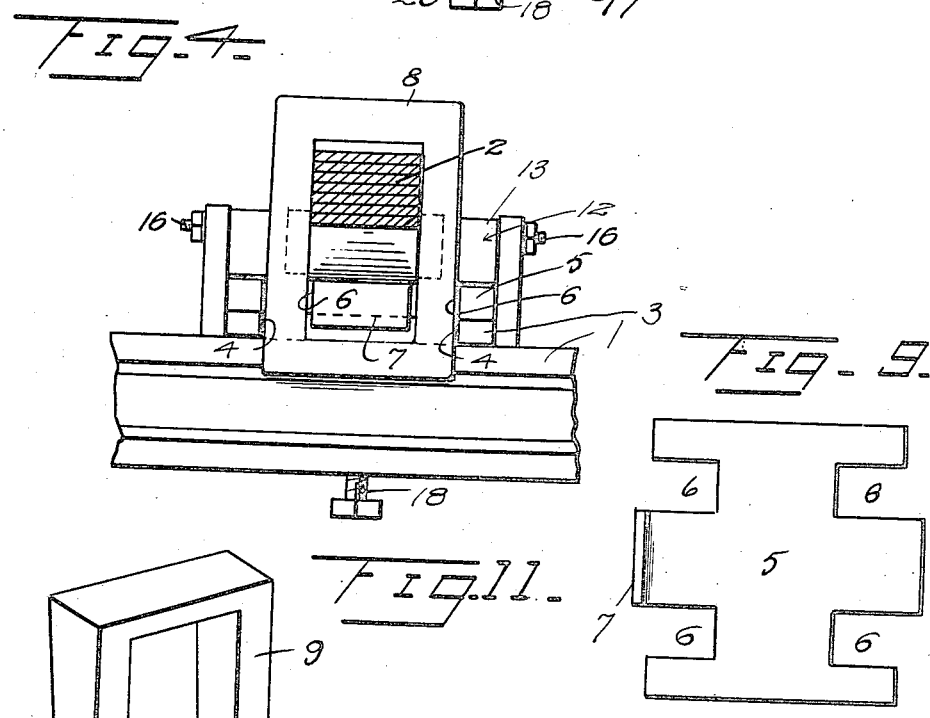
Inventor
J. P. Daniels
Attorney J. P. DANIELS.
AUTOMOBILE SPRING CLIP.
APPLICATION FILED NOV. 18, 1921.
1,435,052.
Patented Nov. 7, 1922.
3 SHEETS—SHEET 3.
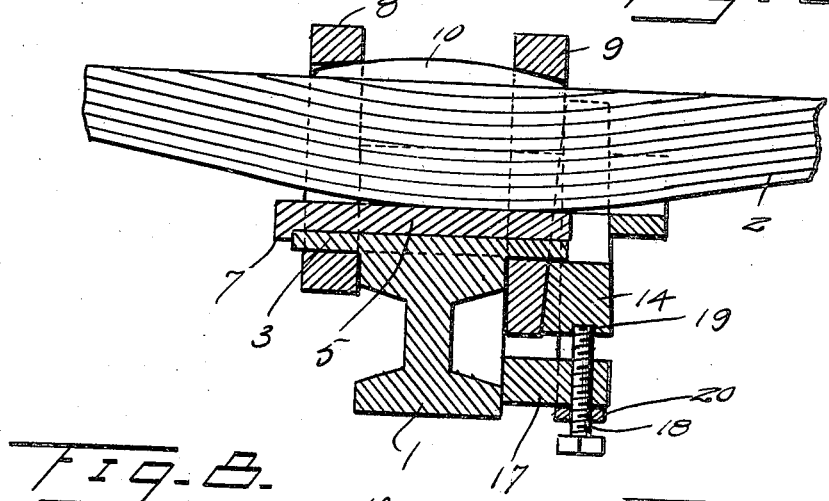
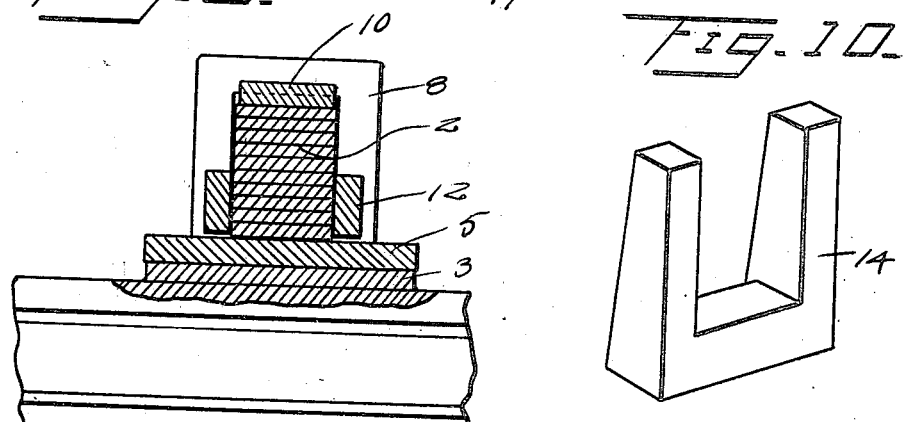
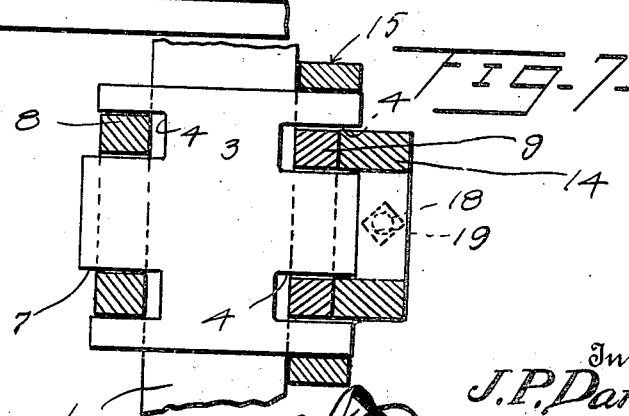
Inventor
J. P. Daniels.
By
Attorney Patented Nov. 7, 1922.

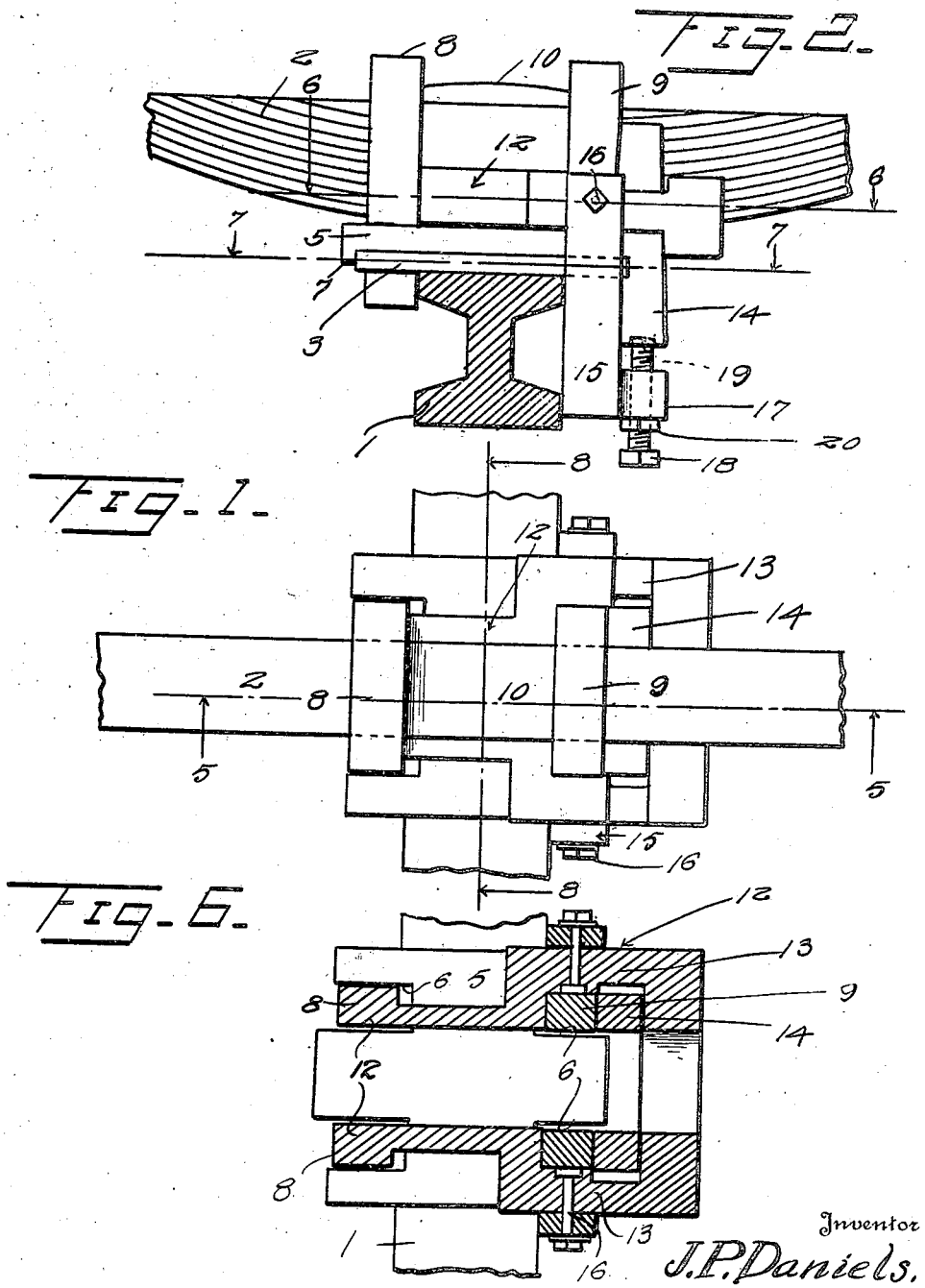

1,435,052

UNITED STATES PATENT OFFICE.

JOHN P. DANIELS, OF CLYMAN, WISCONSIN.

AUTOMOBILE SPRING CLIP.

Application filed November 18, 1921. Serial No. 516,113.

*To all whom it may concern:*

Be it known that I, JOHN P. DANIELS, a citizen of the United States, residing at Clyman, in the county of Dodge and State of Wisconsin, have invented certain new and useful Improvements in an Automobile Spring Clip; and I do hereby declare the following to be a full, clear, and exact description of the invention, such as will enable others skilled in the art to which it appertains to make and use the same.

This invention has relation to certain new and useful improvements in an automobile spring clip and has for its primary object the provision of a spring clip which will be highly efficient in use and very simple and comparatively inexpensive in construction and formed of cooperating members in such a manner that the spring may be readily secured in position or removed, as desired.

The invention has for a further object the provision of a spring clip of the character stated which may be readily secured in operative position or released and removed, together with the spring, positioned on the axle of the motor vehicle or again replaced with the spring to securely clamp the latter in proper position on the axle.

The invention has for a still further object the provision of a spring clip of the character stated which may be composed of the minimum number of parts of simple construction and arrangement and which will cooperate when in proper position to securely hold the spring in proper place upon the axle but which will permit of ready removal and replacing of the spring, as the case may require or as may be desired, without the requirement of special tools for this purpose.

The invention has for a still further object the provision of a spring clip for the motor vehicle as set forth and which will be of such construction that the locking parts and other members may be readily placed in position or removed when the locking screw or set screw is loosened to permit swinging of the locking member of the clip structure.

A still further object of the invention resides in the provision of a spring clip for a motor vehicle which will be of such construction that it may be employed on vehicles now in general use with only a slight alteration of or addition to the axle or may be incorporated in new motor vehicle structures with practically no additional cost or a very small additional cost in the manufacture of the machine.

With the foregoing and other objects in view as will appear as the description proceeds, the invention consists in the novel construction, combination and arrangement of cooperating elements as hereinafter more specifically set forth, claimed and shown in the accompanying drawings forming a part of the present application and in which:—

Figure 1 is a top plan view of the device in use, showing the spring and the portion of the axle upon which the spring is mounted.

Figure 2 is a side elevation.

Figure 3 is a front elevation, showing the device as it appears from the forward end of the machine.

Figure 4 is a rear elevation of the clip in use.

Figure 5 is a detail longitudinal section on the plane of line 5—5 of Figure 1, looking in the direction indicated by the arrows.

Figure 6 is a sectional view on the plane of line 6—6 of Figure 2, looking in the direction indicated by the arrows.

Figure 7 is a view similar to Figure 6, taken on the plane of the line 7—7 of Figure 2, and looking in the direction indicated by the arrows.

Figure 8 is a sectional view on the plane of line 8—8 of Figure 1, looking in the direction indicated by the arrows.

Figure 9 is a detail view of the bed plate, removed.

Figure 10 is a detail view of the wedge members, removed.

Figure 11 is a detail view of the slidable clip member, removed.

Referring more in detail to the drawings in which similar reference characters designate corresponding parts throughout the several views, 1 indicates the axle and 2 the spring, while 3 designates the supporting plate or base member carried on the axle beneath the point over which the spring 2 is to be positioned. In order to employ the improved form of clip which will be described in detail for securing the spring 2 in position upon the axle 1, the plate 3 must be provided with a pair of slots 4 in its forward and rear edges, as will be seen by referring to the drawings. To fit cars in use, with my improved clip, the axle may be cut away to provide slots in its front and rear edges and in equipping new cars the plate 3 having slots is securely fastened to the axle 1 in any suitable manner. Otherwise, the construction of the motor vehicle need not be altered to accommodate the improved form of clip.

In providing a clip to retain the spring 2 in position upon the axle 1, a bent piece or bent plate 5 is provided to rest on the plate 3 carried by the axle 1 and corresponding thereto. This bent plate 5 has pairs of slots 6 provided in its forward and rear edges to correspond with the slots 4 of the plate 3. The bent plate 5 also has a depending central tongue 7 at its rear end to limit forward movement of the plate 5 upon the plate 3, as will be later clearly understood.

The clip structures include the rear clip member 8 which may be termed a stationary clip member and which is adapted to engage over the spring 2. The forward clip member 9 is also provided and this member may be termed a sliding clip member, as a sliding movement of the same on the spring 2 is necessary in placing the clip in position or removing the clip. These clip members 8 and 9 serve to retain in proper position on the upper face of the spring 2, the head block 10 which has its upper face beveled in its opposite end portion to be received beneath the upper sides of the clip members 8 and 9 and which latter are also beveled to correspond with the beveled ends of the head block 10, as will be readily seen by referring to Figure 5 of the drawings. The lower end portions of the clip members 8 and 9 are adapted to rest in the registering slots 4 and 6 of the plates 3 and 5 when the clip members 8 and 9 are in proper position to retain the spring 2 on the axle 1. A substantially rectangular frame member 12 is extended forwardly from the rear clip member 8 with which it is made integral or to which it is securely attached in any suitable manner, and rests upon the upper face of the plate 5, when the parts are assembled on the spring 2. The forward portion of the frame 12 is offset outwardly, as shown at 13 so as to provide space for sliding movement of the slidable spring clip member 9 in placing the clip structure in position or removing the same, as will be more clearly set forth. It is to be noted that the outer side face of the slidable clip member 9 is beveled downwardly but this slidable clip member 9 may be forced rearwardly on the spring 2 by the substantially U-shaped wedge member 14 having one face of its legs beveled to correspond with the bevel of one face of the vertical portions of the slidable clip member 9. This wedge member 14 is adapted to be forced upwardly in the forward portion of the frame 12 to the position shown in Figures 1 to 3 and Figures 5, 6 and 7 of the drawings. This will serve to tighten the clip members 8 and 9 upon the spring 2 and draw these clip members toward the opposite sides of the axle 1.

In order to securely hold the wedge member 14 in proper position, a substantially U-shaped latch member 15 has been provided. This latch member 15 has its opposite leg portions pivoted on the offset end portion 13 of the frame 12, as shown clearly in Figure 2 of the drawings. This will permit the latch member 15 to swing upon its pivot members 16 to bring the wide lower end or body portion 17 of the latch member 15 to position beneath the bottom or body portion of the member 14 and hold the latter in operative position. It is also evident that the latch member 15 may be swung outwardly upon its pivot members 16 to permit insertion or withdrawal of the wedge member 14. To retain the latch member 15 in operative position, a set screw 18 is threaded through the enlarged lower portion 17 thereof and adapted to be received in a socket 19 or the like in the bottom of the wedge member 14. A lock nut 20 is also preferably employed on the set screw 18 to retain the latter in its adjusted position and thereby prevent the clip from working loose on the frame 2.

The plate 5 may be dispensed with when in ordinary practice there is a complete spring in use. However, should a leaf of the spring become broken, the same may be removed and the plate 5 inserted on the base 3 and there be employed as a filler or shim. The structure thus built up will serve temporarily to maintain the spring at its usual thickness and it may be used until the motorist reaches a repair shop where the broken leaf may be replaced.

The salient feature of my invention is its ease of operation and attention is especially called to this feature of the invention, the ease with which the device may be assembled and disassembled being a means of saving time and labor. The manner of removing the clip with the spring 2 and replacing the spring and clip may be briefly stated as follows. With the clip structure in the position shown in the drawings, it will be first necessary in order to remove the spring and clip, to loosen the set screw 18. The latch 15 may then be swung forwardly upon its pivot members 16 to clear the lower edge of the wedge member 14 and permit withdrawal of the latter. After the wedge member 14 has been withdrawn, the slidable clip member 9 is forced forwardly on the spring 2 to release the said clip from the kerfs or slots in the base plates and the entire structure is then moved in the opposite direction to release the clip 8 from its recepient slots in the base plate. The spring, carrying the entire clip structure excepting only the wedge 14, may then be removed from the axle. The head block 10 may of course be removed when the clips 8 and 9 are released from the slots or kerfs in which they interlock.

In the assembling of the clip and spring on the axle the above process is reversed. The clip is assembled on the spring and the clip member 8 is engaged in the slots of the base plate and the spring is permitted to rest on the axle while the clip member 9 is moved to interlock with the base. The wedge member 14 is inserted in place and driven home to bind the leaves of the spring to each other and to the axle. The head block 10 is replaced on the spring before the clip 9 is forced home. When the wedge is in place the latch member 15, carrying the screw 18, is swung into place beneath the wedge and the screw is tightened to hold the wedge against accidental displacement. As occasion may require further tightening of the clip may be accomplished by the adjusting of the screw 18 and the consequent movement of the wedge.

While the preferred embodiment of the invention has been shown and described, it is to be understood that minor changes in the details of construction and arrangement of parts may be resorted to within the scope of what is claimed without departing from the spirit of the invention.

What is claimed is:—

1. A spring clip for a motor vehicle comprising a base plate adapted to be secured on an axle, a pair of clip members adapted to be extended around the spring of the motor vehicle and locked with the said plate and axle, a head block adapted to be secured on the spring by said clip members, a wedge member for driving said clip members into position, a frame for enclosing one of said spring clip members and said wedge member, means for retaining said wedge member in operative position.

2. A spring clip for a motor vehicle comprising the combination with the axle and spring of a motor vehicle and a plate carried by said axle, of a base plate resting on the first mentioned plate, clip members adapted to be locked with said plate and extended over said spring, one of said spring clip members being movable toward and away from the other of said clip members, a head block adapted to be retained in position on said spring by said clip members, means for forcing said clip members toward one another and tightening the spring on said plate, and means retaining the last mentioned means in inoperative position.

3. A spring clip for a motor vehicle comprising the combination with the axle having a slotted plate thereon and the spring of a motor vehicle, of a base plate resting on the first mentioned plate and having slots registering therewith, means carried by said base plate to limit movement of the base plate in one direction across the first mentioned plate, a frame resting on said base plate, clip members adapted to extend around said spring, one of said clip members being carried by said frame, the remaining clip member being adapted to slide in said frame toward and away from the first mentioned clip member, means adapted to be driven into said frame to force said clip members towards one another and lock the same in the grooves of said plates, and means to retain the last mentioned means in inoperative position.

4. A spring clip for a motor vehicle comprising the combination with the axle and slotted plate mounted thereon and the spring extended across said axle, of a base plate resting on the first mentioned plate and having slots registering therewith, a frame resting on said plate, a clip member carried by said frame and extended around said spring, a second clip member movable in said frame and extended around said spring, said clip members being adapted to be forced into said registering slots of the plates to secure the spring on said axle, a head block adapted to be secured in position by said clip members when in their operative position, a pivoted latch member for retaining the wedge member in operative position, and means for locking said latch member and said clip members against movement when secured in set position.

5. A spring clip for a motor vehicle comprising the combination with an axle having a plate secured thereon with opposite edges slotted, and a spring extended transversely above said axle, of a base plate resting on the first mentioned plate and provided with slots registering with the slots of the first mentioned plate, a frame resting on said base plate and having an offset portion, a stationary clip member carried by said frame and extending around said spring, a second clip member movable in the frame and engaged around said spring, said clip members being adapted to engage in the slots of said plates when in operative position, a head block adapted to be secured in the upper portion of said clip members and upon the spring, said head block having opposite beveled end portions, said clip members being beveled to correspond with and receive the ends of said block, one of said clip members having beveled portions to receive a wedge member, a locking member having a beveled portion for engagement with the last mentioned beveled portions of the clip member to force the latter to move in said offset portion of the frame and slide upon the spring toward the stationary clip member, a pivoted latch member carried by the offset portion of said frame and adapted to be moved to position opposite said locking wedge member to retain the latter in position, and locking means for said latch member to lock the latter with said locking wedge member and retain all of the parts of the spring clip in operative position.

6. A spring clip for motor vehicles comprising a base plate, a pair of clip members to be extended around a spring and locked with said base plate, one of said clips being longitudinally movable on the spring, a frame resting on the said plate and limiting the longitudinal movement of the movable clip, and means operative with said frame to move said movable clip into operative position.

7. A spring clip for motor vehicles comprising a base plate, a pair of clip members to be extended around a spring and locked with said base plate, one of said clips being longitudinally movable on the spring, said movable clip having a bevel face, a wedge member to cooperate with said bevel face to move said clip into operative position, and means to prevent the loosening of said wedge.

8. A spring clip for vehicles comprising a base plate, a pair of clip members for interlocking engagement with said base when in their operative positions, one of said clips being carried by a frame and means associated with said frame for forcing one clip toward the other.

9. A spring clip for vehicles comprising a base plate, a pair of clip members for interlocking engagement with said base plate when in their operative positions, a frame, one of said clips being carried by said frame, the other of said clips being longitudinally movable within said frame, and means whereby to cause said clip to move into interlocking engagement with said plate.

10. A spring clip for vehicles comprising a base plate, a pair of clip members for interlocking engagement with said base plate when in their operative positions, a frame, one of said clips being carried by said frame, the other of said clips being longitudinally movable within said frame, a wedge to be interposed between said movable clip and the frame to cause said clip to move into locking position, and means to hold said wedge in operative position.

11. A spring clip for vehicles comprising a base plate, a pair of clip members for interlocking engagement with said base plate when in operative position, means holding one of said clip members against longitudinal movement, means permitting longitudinal movement of the other of said clips, and means for causing said movement of said last named clip.

12. A spring clip for vehicles comprising a pair of clip members encircling the spring of the vehicle, means holding one of said clip members against longitudinal movement, means permitting longitudinal movement of the other of said members, and means for causing said movement of said last named clip.

In testimony whereof I affix my signature in presence of two witnesses.

JOHN P. DANIELS.

Witnesses:
W. H. KUENZT,
FRANK R. RICHTER.